July 21, 1953 R. C. LASSIAT ET AL 2,646,407
ART OF HANDLING FLUENT PARTICLES
Filed April 30, 1948 4 Sheets-Sheet 1
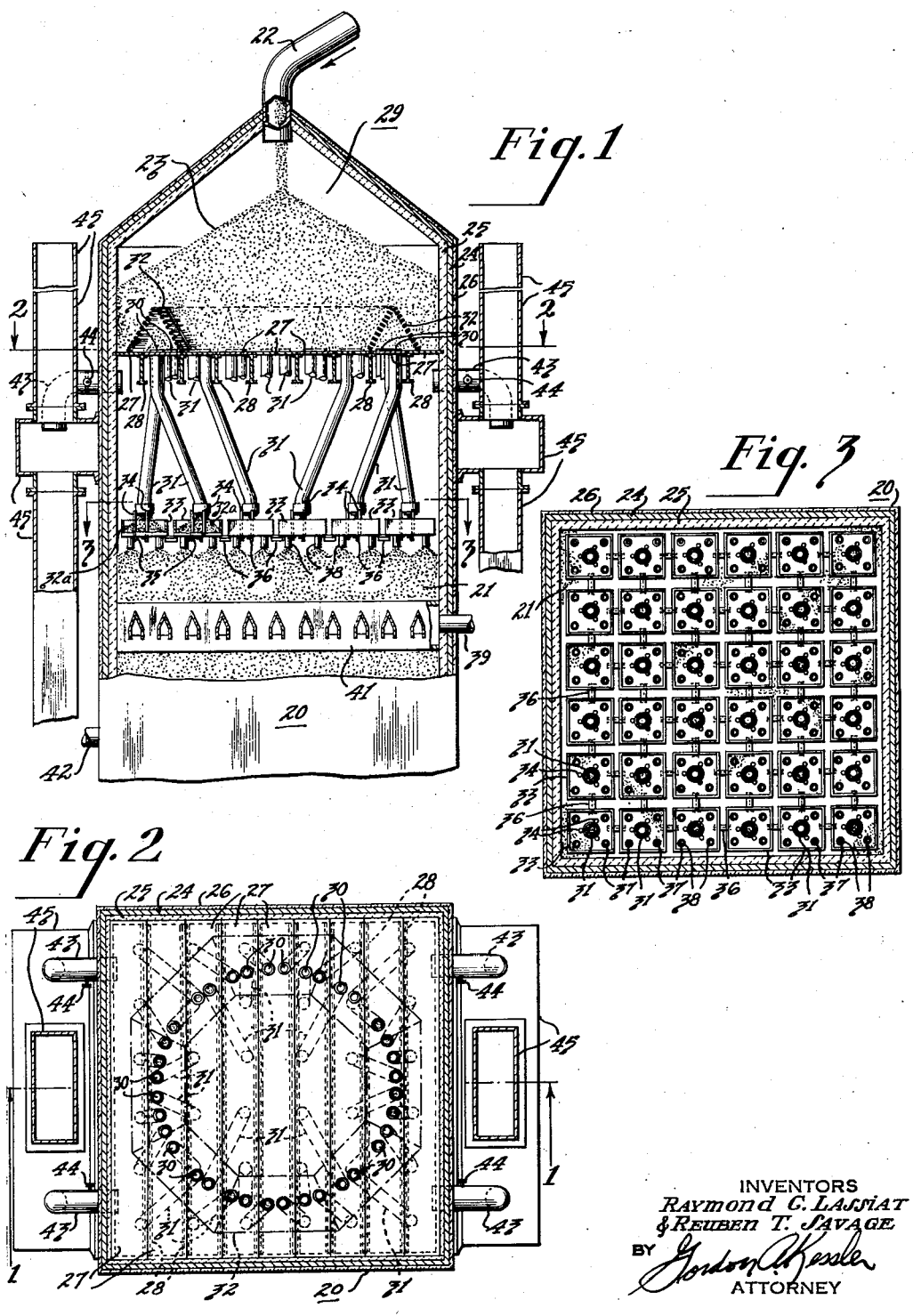
INVENTORS
Raymond C. Lassiat
& Reuben T. Savage
BY
ATTORNEY

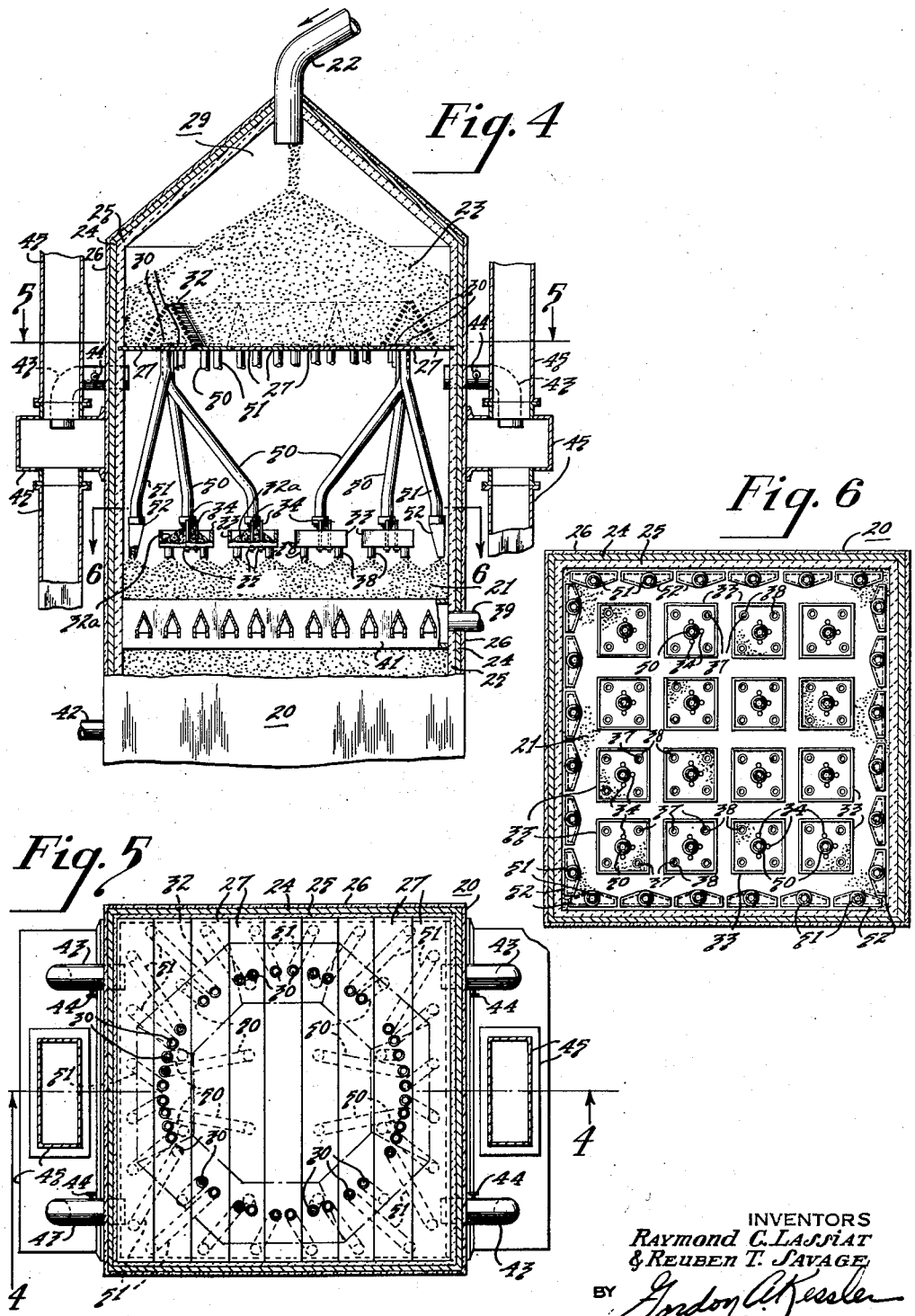

July 21, 1953 R. C. LASSIAT ET AL 2,646,407
ART OF HANDLING FLUENT PARTICLES
Filed April 30, 1948 4 Sheets-Sheet 3
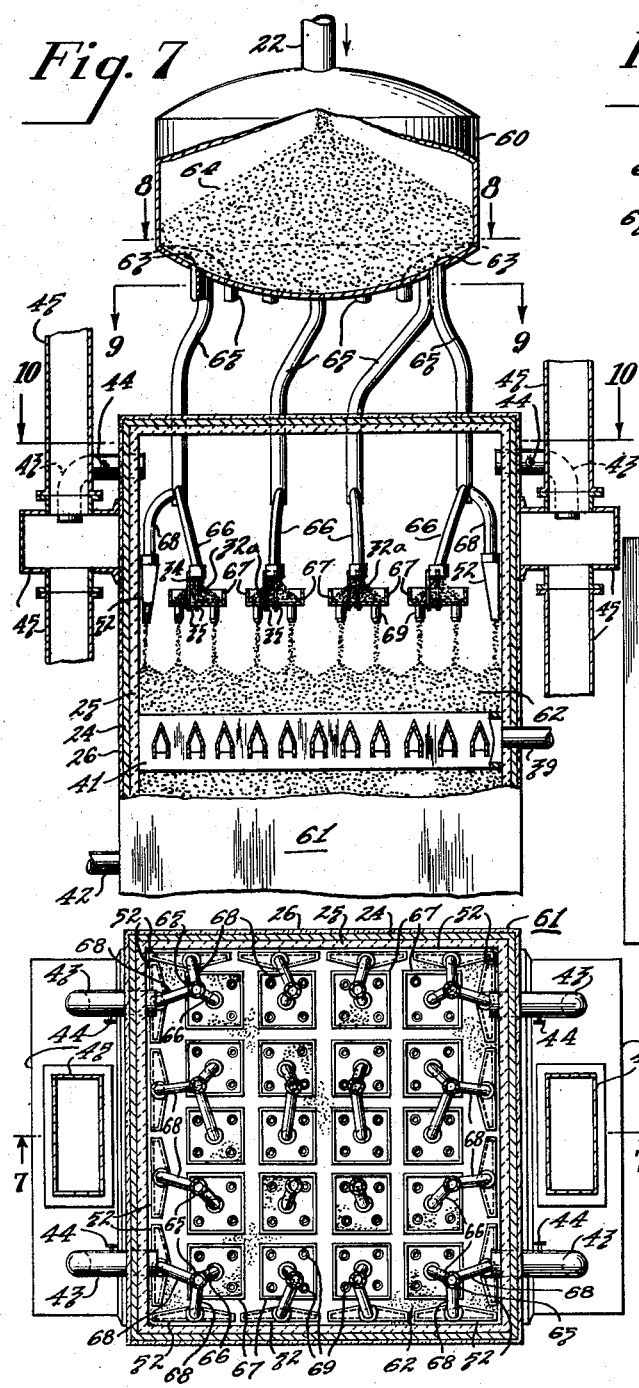
Fig. 7
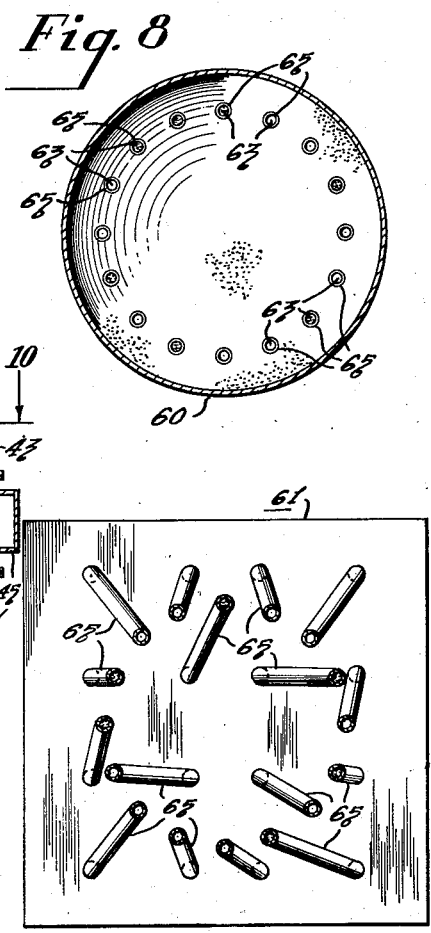
Fig. 8
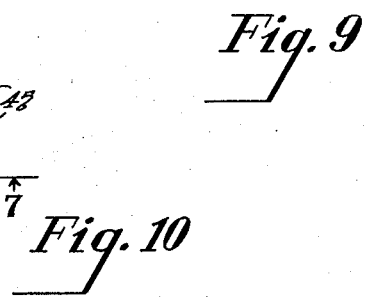
Fig. 9
Fig. 10
INVENTORS
Raymond C. Lassiat
& Reuben T. Savage
BY Gordon A. Kessler
ATTORNEY July 21, 1953  R. C. LASSIAT ET AL  2,646,407
ART OF HANDLING FLUENT PARTICLES
Filed April 30, 1948  4 Sheets-Sheet 4
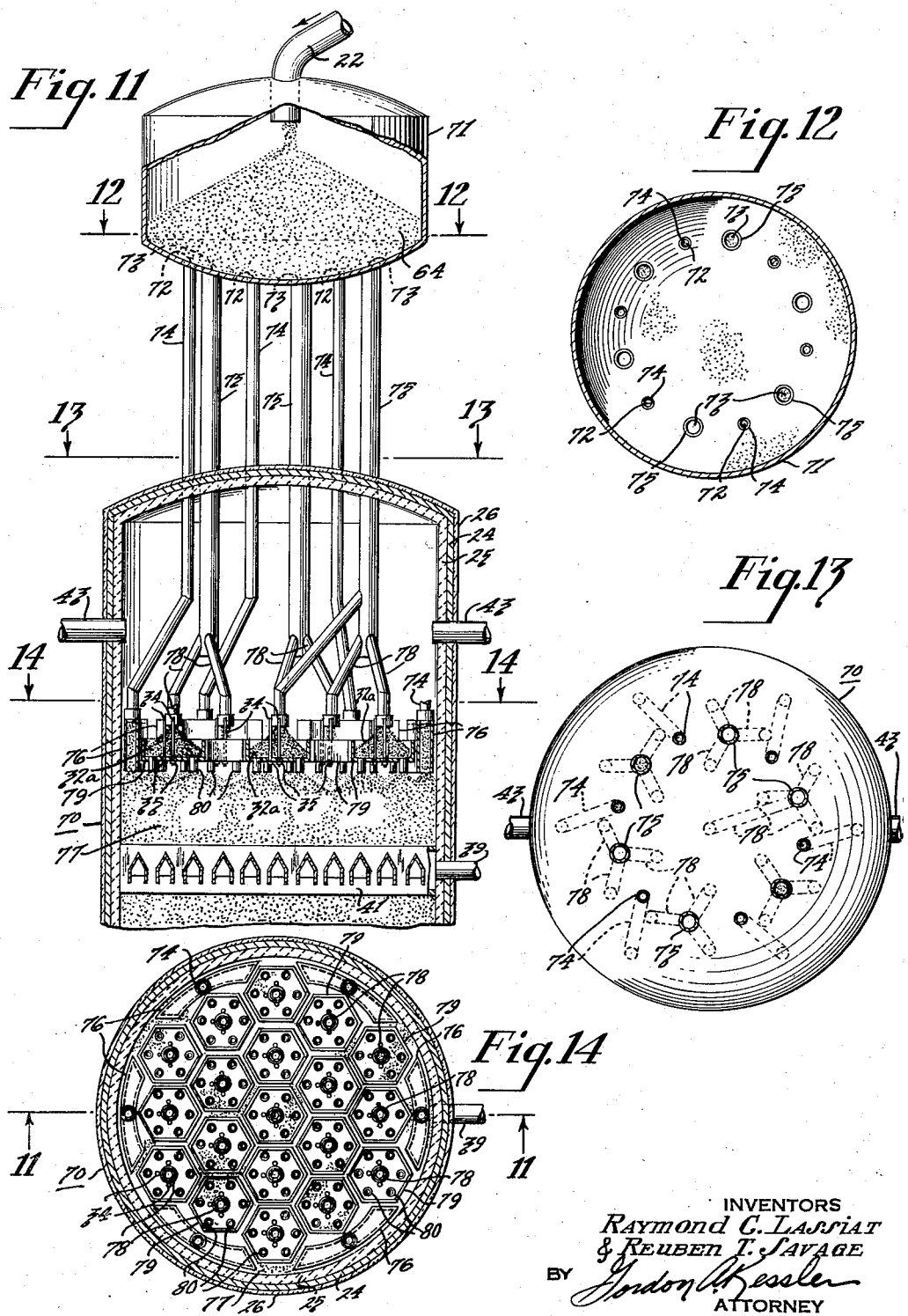
INVENTORS
Raymond C. Lassiat
& Reuben T. Savage
BY
ATTORNEY Patented July 21, 1953

2,646,407

UNITED STATES PATENT OFFICE 2,646,407

ART OF HANDLING FLUENT PARTICLES

Raymond C. Lassiat, Swarthmore, and Reuben T. Savage, Ridley Park, Pa., assignors to Houdry Process Corporation, Wilmington, Del., a corporation of Delaware Application April 30, 1948, Serial No. 24,238

11 Claims. (Cl. 252—411)

The use of moving bodies of fluent solid particles in processes that involve the contact of masses of such solid particles with fluids, as, for example, catalytic conversions of organic vapors by solid catalysts, such as the catalytic cracking of hydrocarbons, has resulted in certain advantages due to the continuous nature of the process but has also created problems arising from the nature of the process. One such problem involving the introduction of the fluent solid particles to the contacting zone or chamber may be overcome by using methods and apparatus embodying the present invention.

An obviously desirable and sometimes essential condition for the uniform contact of a contact mass or body of solid particles with a fluid in a contacting zone is that the body of particles be uniform in average size over the cross sectional area of the body normal to the direction of flow of the fluid since otherwise the flow of the fluid through various portions of the body is unequal with resultant inequalities in the time of contact or extent of treatment or both and, if heat effects are present, with resultant inequalities in the temperature of various portions of the body. Such effects are particularly noticeable when the body of solid particles is a non-turbulent bed which moves downwardly under the influence of gravity as essentially a fluent mass or bed of particles.

Such a condition often occurs when the operation of the process continues over an extended period of time because of the development, by attrition, of a range of particle sizes even though the particles constituting the original contact mass were initially of the same size, which is not always the case due to variations encountered in the manufacture of the solid particles. Another factor contributing to the variation in particle size is the common practice of adding fresh particles to the system from time to time to compensate for particles reduced to such a fine size that they are intentionally removed from the system or are carried out by effluent gases or fluids.

Thus, a typical used contact mass consisting of particles whose size was originally in a range between 4 to 8 mesh may have as much as 7 percent of particles between 8 and 10 mesh and 15 percent of particles smaller than 10 mesh in addition to material in the original range after six months of operation. (Percentages given herein are on a weight basis unless otherwise specified.)

It is known that a mass of fluent solid particles varying in size has a tendency to segregate so as to develop portions containing predominantly particles of larger size and other portions containing predominantly particles of smaller size when subjected to flow down an inclined path (i. e., flowing a mass of such particles down an inclined path results in an non-uniform distribution of particles of the same size over the cross section of said mass normal to the direction of flow even though the mass originally had a uniform distribution in respect to particle size). This effect is encountered in flow down an inclined pipe or in the discharge of solid particles in a relatively small zone (as from a pipe) above the top or apex of a relatively large body or pile of such particles, when the upper surface of the body is free or unrestricted and hence inclined at the free angle of repose of the solid particles with the horizontal so that the particles flow or roll down the free upper surface.

The latter condition obtains when a stream of solid particles is fed to a contacting zone whose lateral cross sectional area is considerably greater than the cross sectional area of the supplying stream and is exemplified in most contacting vessels containing moving non-turbulent beds of solid particles. Under these conditions, the larger particles apparently roll down the free upper surface of the pile (this free upper surface being roughly conical) at a faster rate than do the smaller particles. At any event, experiment has shown that the finest particles tend to accumulate directly below the point of discharge and that the average particle size increases in a direction radial from the vertical line on which the point of discharge lies, the largest particles thereby being concentrated at the periphery of the pile. It is therefore obviously undesirable to supply solid particles to the top of a non-turbulent bed of solid particles as a single stream of restricted cross section.

Moreover, when introducing solid particles to a contacting zone it is preferable, because of possible variations in the supply rate, to have a supply chamber containing a body or pile of solid particles, from which chamber the solid particles are fed to the contacting zone and which has sufficient capacity to maintain a constant rate of flow of solid particles to the contacting zone during variations in the rate at which the solid particles are fed to the supply chamber. If, however, the solid particles are discharged as streams located at points evenly distributed over the bottom of the pile of solid particles in the supply chamber (i. e., the points of discharge are located at the intersections of a square grid), these streams will contain particles whose average size varies considerably due to the segregation effects described above.

In accordance with the present invention, fluent solid particles varying in size as described above are supplied or fed to a contacting zone of considerable lateral extent in a manner, described more fully below, such that approximately constant distribution of the particles of the same size is effected over substantially the entire cross sectional area of said contacting zone by supplying said particles to a relatively small zone at the top of a body or pile of said particles in a supply chamber located above the contacting zone and of substantial lateral extent. The supply chamber is adapted to confine the body of particles at its sides and bottom while allowing the upper surface of the body to be free so that it is inclined at the free angle of repose. The supply chamber is provided with outlets individually communicating with the open upper ends of downwardly directed conduits for discharging the particles from the bottom of the body as a multiplicity of solid streams. The outlets are arranged at points spaced equidistantly away from the vertical axis of the center of said body and, as explained below, thereby discharge streams of particles having the same distribution of particle size (i. e., the average particle size is approximately the same). These outlets are also arranged and located so that the solid streams in the downwardly directed conduits averagely travel small lateral distances to the points of discharge, located as described below.

The points of discharge, several of which may be associated with a single outlet from the supply chamber, are each at the center of one of a multiplicity of equal area subdivisions of at least the major portion of the transverse cross sectional area of the contacting zone. Each point of discharge is associated with an individual solid stream of particles which discharges from the open lower end of a conduit in a restricted zone at the top of a relatively small body or pile of particles, the size of this body being only a small fraction of the size of the body in the supply chamber and the lateral area of this body being only a small fraction of the lateral area of the contacting zone. The various relatively small bodies of particles are confined at the sides and bottom by individual receptacles which are located below and spaced apart from the lower open ends of the conduits for discharging the individual solid streams of particles as described herein. The bottoms of the receptacles are provided with outlets spaced equidistantly away from the center thereof, these outlets being substantially equidistantly spaced from each other. By means of conduits which are individually associated with each outlet from a receptacle and which communicate with the contacting chamber or zone, the solid particles are introduced to the contacting zone as a considerable multitude of relatively small streams of catalyst having approximately the same distribution of particle size whereby approximately constant distribution of particles of the same size is effected over the cross sectional area of the contacting zone.

The principles involved in the present invention are set forth in detail below in connection with the description of the drawings in which various preferred embodiments of the present invention are shown. It is to be understood that these preferred embodiments are to be regarded as illustrating the present invention rather than as restricting its scope. In the drawings:

Figs. 1, 4, 7 and 11 are vertical views of the upper portions of vessels containing moving beds of solid particles with portions of the vessels broken away for a better view of the relationship of the parts;

Figs. 2 and 3 are transverse sections of the vessel illustrated in Fig. 1 taken along the lines 2—2 and 3—3 respectively, showing the relationship of the parts of the apparatus at these levels.

Figs. 5 and 6 are transverse sections of the vessel illustrated in Fig. 4 along the lines 5—5 and 6—6 respectively, showing the relationship of the parts of the apparatus at these levels;

Figs. 8, 9 and 10 are similar transverse sections of the vessel shown in Fig. 7; and Figs. 12 and 13 are similar transverse sections of the vessel shown in Fig. 11.

Shown in Fig. 1 is a closed housing or vessel indicated generally at 20 containing a downwardly moving non-turbulent bed of solid particles 21 which are contacted with fluids as described below. Solid particles are introduced to the housing by means of pipe or conduit 22 which contains a stream of particles only partially filling it and from which the stream of particles discharges at the top or apex of a large body or pile 23 of solid particles in a relatively small zone (i. e., the diameter of the stream of particles impinging on the top of the body or pile is relatively small in respect to its lateral extent). The body of particles is of substantial lateral extent and is confined by the sides 24 of housing 20, which may be lined with a refractory lining 25 and covered by a layer of insulation 26, and by plate 27 which is supported within the housing by beams 28. The sides 24 and plate 27 thus form a supply chamber (indicated generally at 29) located above the contacting zone (which comprises all or a part of bed 21 as described below) and within the housing, which supply chamber contains bed 23. Preferably, chamber 29 has sufficient capacity so that body 23 does not completely fill it, the upper surface of body 23 being free and therefore inclined to the horizontal at the free angle of repose of the solid particles of which the body is composed.

As stated above, body 23 and hence supply chamber 29 are of substantial lateral extent, thus providing room for a multiplicity of outlets 30, whose function is described below. In the embodiment of the invention shown in Fig. 1, the supply chamber is within housing 20 and is of identical lateral extent as the lateral extent of bed 21 in the contacting zone. In other phases of the invention, such as in Fig. 7 where the supply chamber is outside the housing, the lateral extent of the body of solid particles and of the supply chamber may be different from the lateral extent of the contacting zone. In such cases, the lateral extent of the bed 21 and of the supply chamber 29 are approximately of the same order of magnitude, generally being less than one and one half and more than one third times the lateral extent of the contacting chamber of the contacting zone.

Solid particles are removed from the bottom of of the body 23 as a multiplicity of solid streams of particles through a multiplicity of outlets 30 in the bottom of chamber 29, which outlets individually communicate with the open ends of conduits 31. (The term solid streams is used in the sense that the conduit is completely filled with solid particles.) The outlets are protected against plugging by a grating 32.

As can be seen from Fig. 2, outlets in plate 27 are arranged equidistantly away from the center of body 23 which is on the same vertical line as the point of discharge from conduit 22 so that the locus of the outlets forms a circle whose center is the center of supply chamber 29. Outlets 30 are preferably arranged at approximately regular intervals around the circle thus providing a symmetrical distribution, although in some instances it is necessary to avoid beams 28 which support plate 27. In general, the radius of the circle on which the outlets 30 lie is approximately one half to two thirds of the average distance between the center of the chamber and the sides thereof. In any event, they are arranged so as to provide averagely small lateral distances of travel between the upper and lower ends of conduits 31.

When the average lateral distances between the upper and lower ends of conduits 31 is small, the solid particles therein are subjected to only a short distance of travel down an inclined path and hence segregate as little as possible in a direction normal to the axis of the conduit.

As noted above, when a stream of solid particles is discharged on the top or apex of a body of particles such as body 23 as described herein, the particles tend to move outwardly from the center of the body in a regular manner. One consequence of this behavior is that the particles in any circular annulus concentric with the center of the body have approximately the same distribution in particle size. It is therefore apparent that the catalyst discharged from the bottom of body 23 through outlets 30 will have the same particle size distribution. Moreover, it has been found experimentally, that although initially the average particle size increases in a radial direction from the center of the body, under equilibrium conditions such as are encountered when the process has been under operation for some time, the size distribution of the particles withdrawn through the outlets will be the same as that supplied to the top of the body. Apparently the catalyst initially segregates when the body is formed and thereafter the material supplied to the top of the body follows such a path downwardly through the bed that the solid particles withdrawn from the bottom in the manner described have not segregated, the initially segregated particles remaining static.

As may be seen in Fig. 3, the lower ends of conduits 31 are disposed individually at the centers of a multiplicity of equal area rectilinear subdivisions of at least a major portion of the transverse cross sectional area of vessel 20. Solid particles from conduits 31 discharge on the tops or apexes of a multiplicity of relatively small bodies of particles 32a held in receptacles 33 located in a plane above 21. Receptacles 33 are placed concentrically below the open ends of conduits 31 and are spaced apart therefrom by rods 34 at such a distance that the relatively small body of particles in each receptacle is confined by the sides and bottom of each receptacle, thus leaving the upper surface of each relatively small body of particles free and inclined at the free angle of repose of the solid particles except where the top of the body engages the open lower end of conduit 31. Rods 34 are affixed to conduits 31 as by welding and may extend through and be bolted to receptacles 33 by nuts 35 or may be affixed to baskets or receptacles 33 as by welding. The relative positions of the individual receptacles are maintained by spacers 36 which are affixed, as by welding, to the receptacles as shown.

Each of receptacles 33, which are in the form of square open top boxes or baskets, has a plurality of outlets 37 in the bottom thereof, these outlets individually communicating with conduits 38. These outlets are arranged equidistantly from the center of each receptacle and substantially equidistantly and symmetrically in respect to each other. Although four outlets from each receptacle are shown in Fig. 3, a smaller number, preferably not less than three or a greater number such as six or more may be used.

As can be seen from Fig. 1, the solid particles in each of bodies 32a are discharged as a plurality of relatively small solid streams of particles (conduits 38 being of smaller diameter than conduits 31), these solid streams being discharged on the upper surface of bed 21. The receptacles 33 and conduits 38 thereby constitute a means, associated with conduits 31, for discharging a multiplicity of small streams of said particles symmetrically and regularly located over substantially the entire transverse cross sectional area of said bed. It is to be noted that the particles in conduits 38 have substantially the same distribution of particles due to the arrangement of the conduits in respect to bodies 32a due to the effect explained above.

In the embodiment of the invention shown in Figs. 1, 2 and 3 the contacting chamber is rectilinear in transverse cross section. Means are thus afforded by the invention for passing particles of the same size range from a circular pattern of distribution (outlets 30 in supply chamber 29) to a rectilinear pattern of distribution (conduits 38). The change in the pattern of distribution is more readily apparent in the embodiment illustrated in Figs. 7, 8, 9 and 10, where the supply chamber is circular in transverse cross section and the contacting zone is rectilinear. As shown by Figs. 11, 12, 13 and 14, the invention may also be used where the contacting chamber is circular in transverse cross section.

In the embodiments shown in Figs. 1, 4, 7 and 11 the bed of solid particles so formed may be used for contacting fluids such as vapors or gases in several ways; for example, a portion of the fluids introduced by conduits 39 and vapor distributor 41 may pass partially upwardly through the bed and partially downwardly through the bed, the latter portion then being removed by conduit 42 which is connected to a vapor distributor (not shown). The portion of fluid passing upwardly passes through the upper surface of the bed and is thereafter removed from the housing by conduits 43, the flow of fluid in conduits 43 being controlled by butterfly valves 44. The fluid removed by conduits 43 passes to manifolds 45 and thereafter to suitable uses or to a disposal system depending on the nature of the fluid.

Alternatively, fluids may be introduced by conduits 39 and removed by conduits 42, only a small portion of the vapors passing through the upper surface of the bed to be removed by conduits 43. Accordingly the contact zone or chamber may start substantially at the top of bed 21 or it may start at vapor distributor 41 and thereafter in either case extend downwardly to include several stages or zones in which fluids are introduced and removed by the same or similar means for introducing and removing fluids described above.

Housing 20 includes any one of several well known means for discharging the solid particles at the bottom thereof (not shown). The rate of discharge of particles from the housing is preferably controlled to effect the desired rate of downward travel of the particles in bed 21. After discharge from the contacting zone, the particles may travel through one or more zones including a regeneration or reactivation zone for restoring any properties changed or modified by the contact of the particles with fluids in housing 20 or through a reaction zone if the operation in housing 20 has been that of regeneration and are thereafter elevated to the top of housing 20 and fed thereto, thus completing one cycle of operation.

The vessel or housing shown in Fig. 4 is constructed and arranged similarly to housing 20 shown in Fig. 1 and is likewise indicated generally as 20. Parts in housing 20 shown in Fig. 4 which are the same as parts in Fig. 1 have been given the same numbers. In general, the solid particles fed to housing 20 in Fig. 4 by conduit 22 travel therethrough in a manner similar to that described in connection with Fig. 1.

In the embodiment shown in Fig. 4 the conduits through which the particles from bed 23 travel comprise two sets of conduits 50 and 51. However, outlets 30 in plate 27 with which the open ends of both sets of conduits 50 and 51 individually communicate are arranged in a similar fashion to outlets 30 in Fig. 1 and have therefore been similarly designated.

One set of conduits 50 is associated with a multiplicity of receptacles 33 which together with conduits 38 constitute a means for discharging particles as a multiplicity of small streams of said particles symmetrically and regularly located at small intervals over the majority of the transverse cross sectional area of housing 20 in the manner described above as can be seen in Fig. 6.

Conduits 51, which are the remainder of the conduits associated with outlets 30, extend downwardly to points spaced regularly around inside wall 24 and spaced immediately above bed 21. The open lower ends of conduits 51 communicate individually with discharge nozzles 52. Discharge nozzles 52 terminate in flared, flattened lower ends as can be seen from Figs. 4 and 6 and are thereby adapted to discharge a layer of particles substantially uniform in size adjacent to wall 24.

It will be noted that conduits 50 communicate with a substantial portion of outlets 30 while conduits 51 communicate with the remainder. Conduits 50 and 51 may be of the same or different diameters and the ratio of the number of conduits comprising one set to the number comprising the other set may be varied within rather broad ranges so long as the conduits perform their function of conveying the solid particles to the designated locations. The relation of the two sets of conduits, the diameter of the conduits and similar factors are generally selected by the design engineer in accordance with functions of the apparatus not directly involved in the present invention, such as pressure drop, seal leg effects and the like. It is, however, preferred that the set of conduits 50 comprise at least a substantial portion of the conduits fed by the particles from body 23.

In regard to Figs. 4, 5 and 6, it is to be noted that the embodiment of the invention described in connection therewith furnishes a method for supplying a multiplicity of relatively small streams of particles having the same distribution of particle size regularly over the entire transverse cross sectional area of bed 21 with special provision for the discharge of such streams adjacent to wall 24. Because of the disposition of conduits 51 and nozzles 52 and the shape of nozzles 52, the point of discharge of the solid stream of particles is quite close to wall 24 and there is scant opportunity for the particles so discharged to roll any considerable distance toward the wall. The advantage of such method is appreciated when consideration is given to the fact that, if the particles rolled a considerable distance toward the wall (as would occur if the top of the pile or the point of discharge were spaced away from the wall a considerable distance), segregation would result. The embodiment described above thereby prevents segregation in the layer of particles adjacent to the wall of the housing.

In the embodiment shown in Figs. 7, 8, 9 and 10, a supply chamber 60 is located outside and above a closed housing indicated generally at 61, which, like housing 20, comprises a contacting zone or chamber containing a bed of solid particles 62. Supply chamber 60, which is circular in transverse cross section, has outlets 63 in the bottom thereof for discharging solid particles from the body or pile of particles 64 contained therein; these outlets being arranged and located in a similar fashion to outlets 30 described above. Solid particles discharge from body 64 and travel downwardly in conduits 65 as solid streams in the fashion described above in connection with conduits 31 except as described below. Conduits 65 extend downwardly from chamber 60, through and below the top of housing 61, to points spaced above and apart from bed 62, a majority of conduits 65 terminating for the most part in closed lower ends. Immediately above such closed lower ends are openings in conduits 65 communicating with smaller branched conduits 66 which extend downwardly to individual receptacles 67 constructed and disposed as described above in connection with receptacles 33. Branched conduits 66 subdivide a substantial portion of the streams in conduits 65 into smaller solid streams directed to receptacles 67. Receptacles 67 are placed concentrically below the discharge ends of conduits 66 and spaced apart therefrom as described above. Conduits 68, which are branched conduits close to the wall 24, are fitted with discharge nozzles 52 of the type described above in connection with the embodiment illustrated in Fig. 4. In a few cases, conduits 65 communicate directly (i. e., without branched conduits) with receptacles 67. In an alternate design, all of conduits 65 communicate with branched conduits.

In the embodiment shown in Fig. 7, conduits 69 communicating with the outlets of receptacles 67 are constricted at their lower ends or alternatively may be of such a diameter that the collective discharge capacity of these conduits is less than that of the conduit feeding the individual receptacle associated with each set of conduits 69. As a consequence the level of bed 62 may be substantially below the discharge ends of conduits 69 so that freely falling streams of particles discharge from conduits 69 and thereafter fall freely downwardly to the surface of bed 62. When such a relationship exists between conduits 66 and the conduits 69 associated with the individual receptacles, the depth or height of bed 62 may be varied without altering the position of receptacles 67 as would be necessary if the discharge rate from receptacle 67 were greater than the feed rate so that a pile of particles could not be maintained in the receptacle.

It is to be noted, however, that unless freely falling streams are to discharge from conduits 69, they may have an equal or greater collective discharge capacity than conduit 66. When the top of the bed 62 is contiguous with the lower ends of conduits 69 (as is the case in Fig. 1), the rate of flow through any of conduits 69, 66 or 65 is determined by the rate at which the bed is discharged from the bottom of the housing. In such a case, although conduits 69 may conveniently be of smaller diameter than conduits 66 or 65, they are not necessarily so and where, in the specification and claims, the solid streams of catalyst in conduits 69 and in conduits performing similar functions are referred to as having smaller diameters than the solid streams in conduits 66 or 65, it is in the sense that the rate of flow in the former is smaller than the rate of flow in the latter.

Shown in Fig. 11 is another embodiment of the present invention in which the housing containing the contacting zone is circular in transverse cross section (indicated generally as 70). Supply chamber 71 is circular in cross section and the bottom is provided with two sets of outlets 72 and 73 which are arranged in a circle in the manner described above. Two sets of conduits 74 and 75 are associated with the two sets of outlets 72 and 73 respectively.

The set of conduits designated as 72 are of smaller diameter than the set of conduits designated as 73 and communicate with nozzles 76 arranged regularly around the periphery of bed of particles 77 as shown in Fig. 14. The other set of conduits 75, which are larger in size, communicate with smaller conduits 78, which smaller conduits have open lower ends spaced concentrically above hexagonally shaped receptacles 79 in the manner described above. Receptacles 79 are provided with outlets communicating with conduits or pipes 80 arranged and disposed in relation to receptacles 79 as were outlets 38 in regard to receptacles 33.

As can be seen from Fig. 14 the circular transverse cross sectional area of bed 77 is supplied with solid particles by streams of catalyst regularly and symmetrically arranged over the entire circular cross section by being discharged from nozzles 76 and conduits 80, as shown.

As can be seen from consideration of the various embodiments described above, the present invention includes within its scope a variety of forms of apparatus for accomplishing the purpose of feeding solid particles of uniform size distribution to a contact zone. A contact zone such as that involved in the present invention may be employed for variety of purposes and processes. Thus the present invention will be found useful in the field of hydrocarbon conversion processes effected by the contact of hydrocarbon fluids with solid catalysts such as the operations of cracking, reforming, hydroforming, hydrogenation, desulphurization, vis-breaking and the like or in the field of processes using inert granular contact masses which may be porous or relatively impervious such as thermal vis-breaking with an inert mass, thermal cracking of hydrocarbon oils to gases, heat transfer and the like.

Exemplary of such processes is the hydrocarbon catalytic cracking process. In accordance with the present invention, the bulk of the solid catalyst particles are preferably within a size range of from more than about 0.01 to less than about 0.5 inch, the ratio of the largest 5 percent of such particles to the smallest 5 percent generally being less than about 20 to 1 and preferably between about 5 to 1 and 10 to 1. Such particles may be fed by the methods described above, using the same or similar apparatus, to either a cracking zone for contact therein with hydrocarbon fractions, such as fractions boiling above gasoline, at cracking temperatures in the range of 650 to 1100° F., or catalyst which has been coked (i. e., accumulated a hydrocarbonaceous deposit) as a result of contact with hydrocarbon fractions in a cracking operation may be fed to a regeneration zone to be contacted therein with a combustion supporting gas for the removal of a portion or all of the coke deposited on the catalyst. Processes involving such cracking and regeneration operations are well known to the art; for example, a description of a typical process related to the present invention is set forth in "The 'T. C. C.' Cracking Process for Motor Gasoline Production" by R. H. Newton, G. S. Dunham and T. P. Simpson, "Transactions of the American Institute of Chemical Engineers," volume 41, page 215, April 25, 1945, and in the articles there cited.

It has been found that, in the operation of commercial size plants, excellent results are obtained with particles of the size described above when the conduits discharging the catalyst on the top of the bed in the contacting zone are spaced between 4 to 18 inches apart.

Contact masses for such processes may consist of appropriately sized particles of natural or artificial aluminosilicates, the latter being of the synthetic gel type, or other synthetic gel cracking catalysts such as catalysts containing silica and other refractory oxides. Typical contact masses from natural products are described in U. S. Patent 2,078,945, issued on May 4, 1937, to E. J. Houdry and from synthetic gels in U. S. Patent 2,429,981, issued on November 4, 1947, to J. R. Bates.

In other processes of the heat transfer or thermal cracking type, the particles may be composed of one or more refractory oxides, such as silica, zirconia, alumina, and may be in a porous or fused state. Also useful are dead burned ores, ground slag, sized heat resistant rocks or pebbles, such as quartz, inactive cracking catalyst and the like.

It has been found that the use of the methods of feeding the catalyst to such zones as described herein increases the efficiency of the contact of the catalyst particles with the hydrocarbon fluids or of combustion supporting gases with resultant increases of yield of the desired products of the cracking reaction or in superior control of the regeneration operation with resultant economies in catalyst life and/or rapidity of regeneration. Also due to the increase in efficiency of contact, higher rates of throughout be maintained and valuable economies in operation may thereby be effected.

Obviously many modifications and variations of the invention as hereinbefore set forth may be made without departing from the spirit and scope thereof and therefore only such limitations should be imposed as are indicated in the appended claims.

We claim as our invention:

1. The process for the introduction into a fluid contacting zone of fluent solid particles varying in size over a range such that flowing a mass of said particles down an inclined path results in a non-uniform distribution of particles of the same size over the cross section of said mass normal to the direction of flow which comprises supplying said particles to a relatively small laterally-fixed zone of deposit at the top of a body of said particles located a substantial distance above said contacting zone and having a free upper surface inclined downwardly from said zone of deposit at the free angle of repose of said particles, discharging said particles from the bottom of said body simultaneously as a multiplicity of solid streams of said particles whose inlets are located on a circular locus about the vertical central axis of said body, directing at least the major portion of said solid streams of discharged solid particles downwardly and laterally to a multiplicity of points uniformly distributed over the upwardly projected horizontal cross-sectional area of the contacting zone, discharging each of said solid streams at the top of a relatively small body of said particles in a zone small in relation to said contacting zone, each of said relatively small bodies being supported in lateral confinement above the contacting zone and having a free upper surface, and discharging particles from each of said relatively small bodies solely as a plurality of vertical solid streams of said particles at points uniformly distributed along a circumference whose center is on a vertical axis through the center of said relatively small body whereby approximately constant simultaneous distribution of particles of the same size is effected over said horizontal cross-sectional area of said contacting zone.

2. The process for the introduction of fluent solid particles varying in size over a range such that flowing a mass of said particles down an inclined path results in a non-uniform distribution of particles of the same size over the cross section of said mass normal to the direction of flow into a zone containing a downwardly moving bed of said particles which comprises supplying said particles to a relatively small laterally-fixed zone of deposit at the top of a body of said particles located a substantial distance above said contacting zone and having a free upper surface inclined downwardly from said zone of deposit at the free angle of repose of said particles, discharging said particles from the bottom of said body simultaneously as a multiplicity of solid streams of said particles whose inlets are located on a circular locus about the vertical central axis of said body, directing a majority of said solid streams of discharged particles downwardly to a multiplicity of points uniformly distributed over the central and major portion of the surface of said bed of particles, directing the remaining solid streams of particles to locations regularly arranged around the periphery of said last-mentioned surface, and flowing the particles in said remaining streams onto the surface of said bed as a peripheral layer, whereby approximately constant simultaneous distribution of particles of the same size is effected over all of the horizontal cross-sectional area of said contacting zone.

3. The process for the introduction into a fluid contacting zone of fluent solid particles varying in size over a range such that flowing a mass of said particles down an inclined path results in a non-uniform distribution of particles of the same size over the cross section of said mass normal to the direction of flow which comprises supplying said particles to a relatively small laterally-fixed zone of deposit at the top of a body of said particles located a substantial distance above said contacting zone and having a free upper surface inclined downwardly from said zone of deposit at the free angle of repose of said particles, discharging said particles from the bottom of said body simultaneously as a multiplicity of solid streams of said particles whose inlets are located on a circular locus about the vertical central axis of said body, directing said multiplicity of solid streams downwardly to points spaced above said contacting zone, subdividing at least a majority of said solid streams into smaller streams, directing said smaller solid streams downwardly and laterally to a multiplicity of points uniformly distributed over the upwardly projected horizontal cross-sectional area of the contacting zone, discharging each of said smaller streams at the top of a relatively small body of said particles in a zone small in relation to said contacting zone, each of said relatively small bodies being supported in lateral confinement above the contacting zone and having a free upper surface, and discharging particles from each of said relatively small bodies solely as a plurality of vertical solid streams of said particles at points uniformly distributed along a circumference whose center is on a vertical axis through the center of said relatively small body whereby approximately constant simultaneous distribution of particles of the same size is effected over said horizontal cross-sectional area of said contacting zone.

4. The process for the introduction of fluent solid particles varying in size over a range such that flowing a mass of said particles down an inclined path results in a non-uniform distribution of particles of the same size over the cross section of said mass normal to the direction of flow into a zone containing a downwardly moving bed of said particles which comprises supplying said particles to a relatively small laterally-fixed zone of deposit at the top of a body of said particles located a substantial distance above said contacting zone and having a free upper surface inclined downwardly from said zone of deposit at the free angle of repose of said particles, discharging said particles from the bottom of said body simultaneously as a multiplicity of solid streams of said particles whose inlets are located on a circular locus about the vertical central axis of said body, directing a portion of said solid streams of discharged particles downwardly and laterally to a multiplicity of points uniformly distributed over the central and major portion of the horizontal surface of said bed of particles, directing the remainder of said solid streams of discharged particles downwardly and laterally to locations regularly arranged around the peripheral surface of said bed, discharging each of the centrally directed solid streams onto the top of a relatively small body of said particles in a zone small in relation to said contacting zone, each of said relatively small bodies being supported in lateral confinement above the contacting zone and having a free upper surface, discharging particles from each of said relatively small bodies solely as a plurality of vertical solid streams of said particles at points uniformly distributed along a circumference whose center is on a vertical axis through the center of said relatively small body, and flowing the particles in the peripherally directed solid streams onto the surface of said bed as a layer adjacent the periphery thereof, whereby approximately constant simultaneous distribution of particles of the same size is effected over all of the horizontal cross-sectional area of said bed.

5. The process of claim 1 in which said fluent solid particles are particles of hydrocarbon cracking catalyst and in which said fluid contacting zone is a zone in which hydrocarbon fluids contact said fluent solid particles of hydrocarbon cracking catalyst.

6. The process of claim 1 in which said fluent solid particles are particles of hydrocarbon cracking catalyst bearing a hydrocarbonaceous deposit as the result of previous use in the conversion of hydrocarbons and in which said particles contact a combustion-supporting gas to effect regeneration of said catalyst in said contacting zone.

7. In apparatus for the contact of solid particles and fluids in a contacting chamber, said apparatus comprising a closed housing containing said contacting chamber, means for the removal of said solid particles from said contacting chamber and from said housing, means for the introduction of fluids to said housing and said contacting chamber, and means for the removal of said fluids from said housing and said contacting chamber, the combination thereof with a supply chamber adapted to contain a large body of said particles and located above said contacting chamber, said supply chamber having a multiplicity of outlets in the bottom thereof located at points the locus of which is a circle whose center is on the vertical axis of said supply chamber and whose radius is approximately half the average distance between said axis and the sides of said supply chamber, said outlets being uniformly spaced along said circle, a multiplicity of conduits communicating with said outlets and extending downwardly from said supply chamber into said housing, a substantial number of said conduits being provided at their lower ends with means for discharging solids at a plurality of locations distributed uniformly over the major portion of the horizontal cross-sectional area of said contacting chamber, the remainder of said conduits having their lower ends located at regularly spaced points around the inner wall of said housing and immediately above said contacting chamber, and provided with nozzles adapted to discharge said particles as a continuous peripheral layer along the inner wall of said contacting chamber.

8. In apparatus for the contact of solid particles and fluids in a contacting chamber, said apparatus comprising a closed housing containing said contacting chamber, means for the removal of said solid particles from said contacting chamber and from said housing, and means for the introduction of fluids to said housing and to said contacting chamber, and means for the removal of said fluids from said housing and from said contacting chamber, the combination thereof with a supply chamber adapted to contain a large body of said particles and located above said contacting chamber, said supply chamber having a multiplicity of outlets in the bottom thereof, the locus of the centers of said outlets being a circle whose center is the center of said supply chamber and whose radius is between approximately half to two thirds of the average distance between the center of said supply chamber and the sides thereof, a multiplicity of receptacles positioned below and spaced apart from the bottom of said supply chamber and positioned above said contacting chamber, the center of each of said receptacles being at a point located at the center of one of a multiplicity of approximately equal area subdivisions of at least the major portion of the transverse cross sectional area of said contacting chamber, a multiplicity of open end conduits communicating with a substantial portion of the outlets from the supply chamber and extending downwardly below said supply chamber to points immediately above said receptacles, each receptacle being associated with the open lower end of one conduit, each of said receptacles being arranged concentrically below the open lower end of each conduit at such a distance that solid particles discharging from said lower end form a body of particles extending laterally to the sides of said receptacle and vertically to the lower end of the conduit thereabove, each of said receptacles having a plurality of outlets in the bottom thereof arranged equidistantly from the center of said receptacles and substantially symmetrically in respect to each other, and conduits individually communicating with each outlet from said receptacles and extending vertically below said receptacles and communicating with said contacting chamber as means for introducing said particles to said chamber.

9. In apparatus for the contact of solid particles and fluids in a rectilinear contacting chamber, said apparatus comprising a closed housing containing said contacting chamber, means for the removal of said solid particles from said contacting chamber and from said housing, and means for the introduction of fluids to said housing and to said contacting chamber, and means for the removal of said fluids from said housing and from said contacting chamber, the combination thereof witth a supply chamber adapted to contain a large body of said particles and located above said contacting chamber and within said housing, said supply chamber having a multiplicity of outlets in the bottom thereof, the locus of the centers of said outlets being a circle whose center is the center of said supply chamber and whose radius is between approximately half to two thirds of the average distance between the center of said supply chamber and the sides thereof, said outlets being arranged at substantially regular intervals around said circle, a multiplicity of open top receptacles positioned below and spaced apart from the bottom of said supply chamber and positioned above said contacting chamber, the center of each of said receptacles being at a point located at the center of one of a multiplicity of approximately equal area rectilinear subdivisions of at least the major portion of the transverse cross sectional area of said rectilinear contacting chamber, a multiplicity of open end conduits communicating with a substantial portion of the outlets from the supply chamber and extending downwardly below said supply chamber to points immediately above said receptacles, each receptacle being associated with the open lower end of one conduit, each of said receptacles being arranged concentrically below the open lower end of each conduit at such a distance that solid particles discharging from said lower end form a body of particles extending laterally to the sides of said receptacle and vertically to the lower end of the conduit thereabove, each of said receptacles having a plurality of outlets in the bottom thereof arranged equidistantly from the center of said receptacle and substantially symmetrically in respect to each other, and conduits individually communicating with each outlet from said receptacles and extending vertically below said receptacles and communicating with said contacting chamber as means for introducing said particles to said chamber.

10. In apparatus for the contact of solid particles and fluids in a contacting chamber, said apparatus comprising a closed housing containing said contacting chamber, means for the removal of said solid particles from said contacting chamber and from said housing, means for the introduction of fluids to said housing and to said contacting chamber, and means for the removal of said fluids from said housing and from said contacting chamber, the combination thereof with a supply chamber adapted to contain a large body of said particles and located within said housing and above said contacting chamber, said supply chamber having a multiplicity of outlets in the bottom thereof, the locus of the centers of said outlets being a circle whose center is the center of said supply chamber and whose radius is between approximately half to two thirds of the average distance between the center of said supply chamber and the sides thereof, said outlets being arranged at substantially regular intervals around said circle, a multiplicity of open top receptacles positioned below and spaced apart from the bottom of said supply chamber and positioned above said contacting chamber, the center of each of said receptacles being at a point located at the center of one of a multiplicity of approximately equal area subdivsions of substantially the entire transverse cross sectional area of said contacting chamber, a multiplicity of open end conduits individually communicating with the outlets from the supply chamber and extending downwardly below said supply chamber to points immediately above said receptacles, each receptacle being associated with the open end of one conduit, each of said receptacles being arranged concentrically below the open lower end of each conduit at such a distance that solid particles discharging from said lower end form a body of particles extending laterally to the sides of said receptacle and vertically to the lower end of the conduit thereabove, each of said receptacles having a plurality of outlets in the bottom thereof arranged equidistantly from the center of said receptacle and substantially symmetrically in respect to each other, and conduits individually communicating with each outlet from said receptacles and extending vertically below said receptacles and communicating with said contacting chamber as means for introducing said particles to said chamber.

11. In apparatus for the contact of solid particles and fluids in a contacting chamber, said apparatus comprising a closed housing containing said contacting chamber, means for the removal of said solid particles from said contacting chamber and from said housing, means for the introduction of fluids to said housing and said contacting chamber, and means for the removal of said fluids from said housing and said contacting chamber, the combination thereof with a supply chamber adapted to contain a large body of said particles and located above said contacting chamber, said supply chamber having a multiplicity of outlets in the bottom thereof, the locus of the centers of said outlets being a circle whose center is the center of said supply chamber and whose radius is between approximately half to two thirds of the average distance between the center of said supply chamber and the sides thereof, said outlets being arranged at substantially regular intervals around said circle, a multiplicity of open top receptacles below and spaced apart from the bottom of said supply chamber and positioned above said contacting chamber, the center of each of said receptacles being at a point located at the center of one of a multiplicity of approximately equal area subdivisions of at least the major portion of the transverse cross sectional area of said contacting chamber, a multiplicity of open end conduits communicating with a substantial portion of said outlets from the supply chamber and extending downwardly below said supply chamber to points spaced above said receptacles, a plurality of conduits communicating with at least a majority of each of said conduits from the supply chamber for subdividing the streams of solid particles in each conduit into a plurality of streams and extending downwardly to points immediately above said receptacles, each receptacle being associated with the open lower end of a conduit and arranged concentrically therebelow at such a distance that solid particles discharging from said lower end form a body of particles extending laterally to the sides of said receptacle and vertically to the lower end of the conduit thereabove, each of said receptacles having a plurality of outlets in the bottom thereof arranged in a manner similar to the arrangement of the outlets from said supply chamber, and conduits individually communicating with each outlet from said receptacles and extending vertically below said receptacles and communicating with said contacting chamber as means for introducing said particles to said chamber.

RAYMOND C. LASSIAT.
REUBEN T. SAVAGE.

References Cited in the file of this patent

UNITED STATES PATENTS

| Number | Name | Date |
|---|---|---|
| 955,614 | Stone et al. | Apr. 10, 1910 |
| 2,423,411 | Simpson | July 1, 1947 |
| 2,474,834 | Fontana | July 5, 1949 |
| 2,477,281 | Bergstrom | July 26, 1949 |
| 2,548,285 | Bergstrom | Apr. 10, 1951 |
| 2,560,604 | Shabaker | July 17, 1951 |
| 2,591,719 | Peavy | Apr. 8, 1952 |